United States Patent
Sasse

(10) Patent No.: US 6,293,533 B1
(45) Date of Patent: Sep. 25, 2001

(54) DASHPOT FOR WHEEL SUSPENSIONS

(75) Inventor: Thomas Sasse, Ennepetal (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/671,645

(22) Filed: Sep. 28, 2000

(30) Foreign Application Priority Data

Oct. 27, 1999 (DE) .............................................. 199 51 728

(51) Int. Cl.$^7$ .................................................. B60G 13/00
(52) U.S. Cl. .......................... 267/221; 267/175; 267/177; 267/286
(58) Field of Search .................................... 267/221, 175, 267/177, 255, 222, 286, 277, 274, 34, 170

(56) References Cited

U.S. PATENT DOCUMENTS

| 5,044,614 | * | 9/1991 | Rau ........................................ 267/221 |
| 5,553,713 | * | 9/1996 | Sydekum et al. ..................... 267/221 |
| 5,553,836 | * | 9/1996 | Ericson ................................. 267/286 |
| 5,954,318 | * | 9/1999 | Kluhsman ............................. 267/175 |
| 5,961,106 | * | 10/1999 | Shaffer ................................. 267/221 |

* cited by examiner

Primary Examiner—Robert Oberleitner
Assistant Examiner—Melanie Torres
(74) Attorney, Agent, or Firm—Max Fogiel

(57) ABSTRACT

A dashpot for wheel suspensions, with a preferably sheet-metal spring cup (6). The cup is attached to a shock absorber or its accommodating tube, supports a helical spring that surrounds the shock absorber or tube, and can be advanced along the shock absorber or tube on threads. To allow the dashpot to be raised and lowered in precise increments, the attachment is maintained tight by a cylindrical housing (3). The housing is provided with a slot extending over its total length and with outside threads. Its inner surface of the housing rests directly against the shock absorber or its tube. The housing operates in conjunction with a height-adjustment ring (12) or neck (7) with matching inside threads on the spring cup. The slope of the threads ensure that the force exerted by the spring on the spring cup will squeeze the slotted housing together radially.

9 Claims, 3 Drawing Sheets

DASHPOT FOR WHEEL SUSPENSIONS

BACKGROUND OF THE INVENTION

The present invention concerns a dashpot for wheel suspensions in motor vehicles.

The present invention concerns a dashpot for wheel suspensions in motor vehicles as recited in the preamble to claim 1.

Dashpots of this genus are employed to suspend and position preferably the wheels that are subject to steering.

A dashpot of this genus is known from German 2 656 707 A1. It includes a spring cup that can be raised off and lowered against a shock absorber or its accommodating tube. This feature facilitates adaptation of the shock absorber's or dashpot's geometry to motors of different weight employed in the same model vehicle. It is particularly desirable when the same dashpot height is required in different countries. Less stock will need to be kept on hand when manufacturing various automobiles in the same series but with different features for example.

There is, however, a drawback to the approach employed in German 2 656 707 in that the position of the spring cup on the shock absorber or its accommodating tube cannot be raised and lowered in precise increments.

SUMMARY OF THE INVENTION

The object of the present invention is accordingly a simple means of reliably attaching the spring cup to the shock absorber or its accommodating tube such that the spring can be raised and lowered in precise increments.

The dashpot in accordance with the present invention has several advantages, the major ones being that the spring cup can be lowered against and raised off the shock absorber or its accommodating tube in precise increments and that the attachment will still be reliable. Furthermore, considerably less noise is transmitted from the wheels to the rest of the vehicle.

BRIEF DESCRIPTION OF THE DRAWINGS

One embodiment of the present invention will now be specified with the accompany drawing, wherein.

DESCRIPTION OF THE PREFERRED EMBODIMENTS

Figure 1:
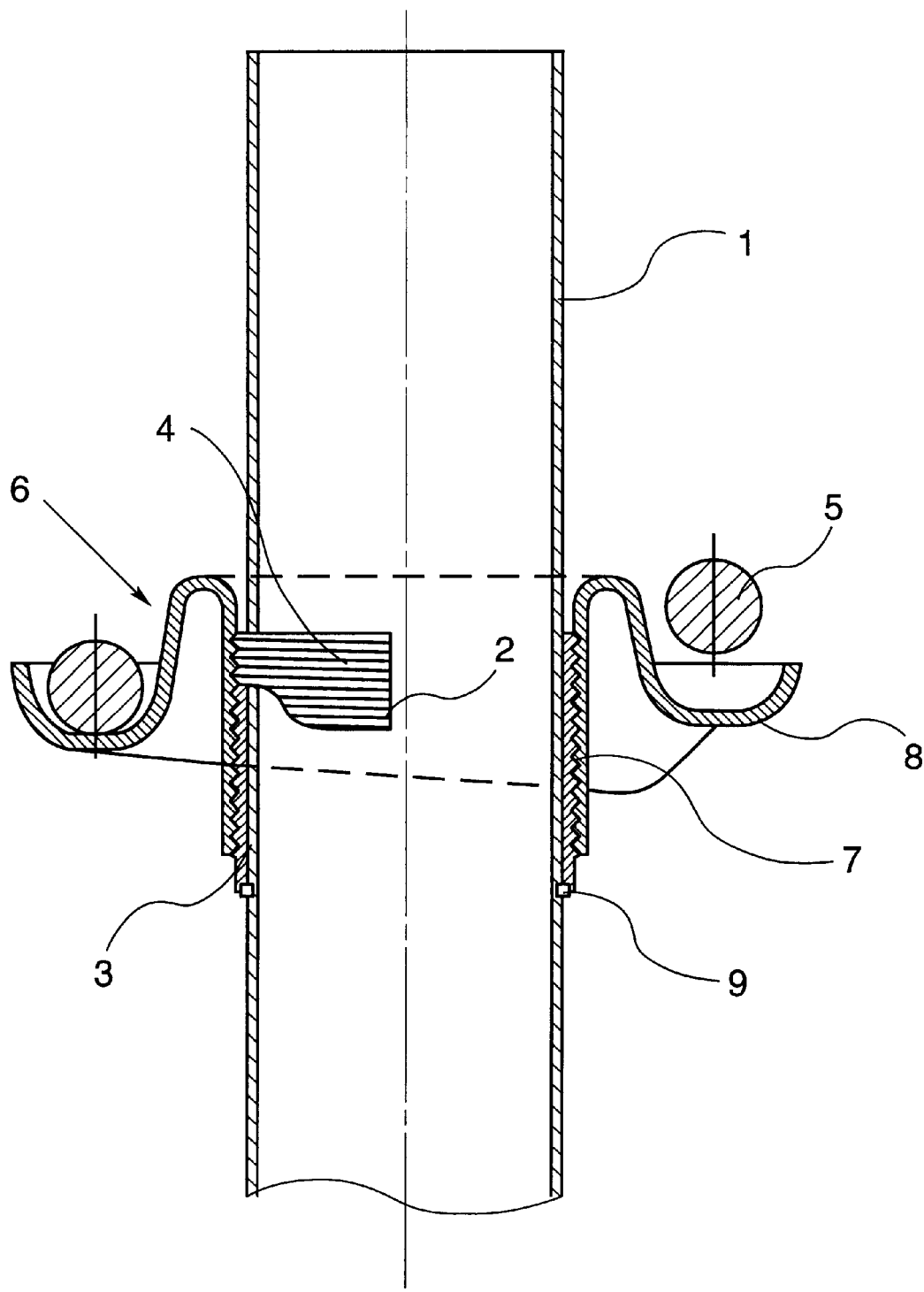
FIG. 1 is a sectional view of one embodiment of a shock absorber with an accommodating tube and an attached spring cup, in accordance with the present invention.

The shock-absorber accommodating tube 1 illustrated in FIG. 1 has an essentially smooth surface and is accommodated in a cylindrical housing 3. Housing 3 is provided with a smooth cylindrical bore with a threaded section 4 and with a longitudinal slot 2.

The spring cup 6 illustrated in FIG. 1 accommodates a spring 5 is a single sheet-metal component that rests against shock-absorber accommodating tube 1. Spring cup 6 is provided with a cylindrical neck 7 with a threaded section inside that matches the threaded section 4 of housing 3. Neck 7 merges into a radially outward-expanding collar 8 with a cross-section matching that follows the slope of spring 5.

Spring cup 6 transmits the spacing force of the vehicle's body to shock-absorber accommodating tube 1 and hence to the attached wheel. The cup accordingly functions as a compression spring. Threaded section 4 ensures that the spacing force exerted by spring 5 on collar 8 will potentially compress cylindrical housing 3. The result is a tight fit between housing 3 and tube 1 as well as between the threaded section 4 of housing 3 and the threaded section inside neck 7. The parts will be inhibited from rotating against each other, securing the level of spring cup 6.

Relieving spring cup 6 of its load will also relieve threaded section 4, decreasing or eliminating the hold between cylindrical housing 3 and shock-absorber accommodating tube 1 and hence facilitating rotation between the two parts. In this state, it will be possible to slide housing 3 along tube 1. Spring cup 6 can be raised and lowered in precise increments by rotation the threaded sections.

A ring 9 accommodated in a groove in shock-absorber accommodating tube 1 supports cylindrical housing 3 against it. The groove is high enough on tube 1 for housing 3 to allow the spring cup to assume its lowest position.

Figure 2:
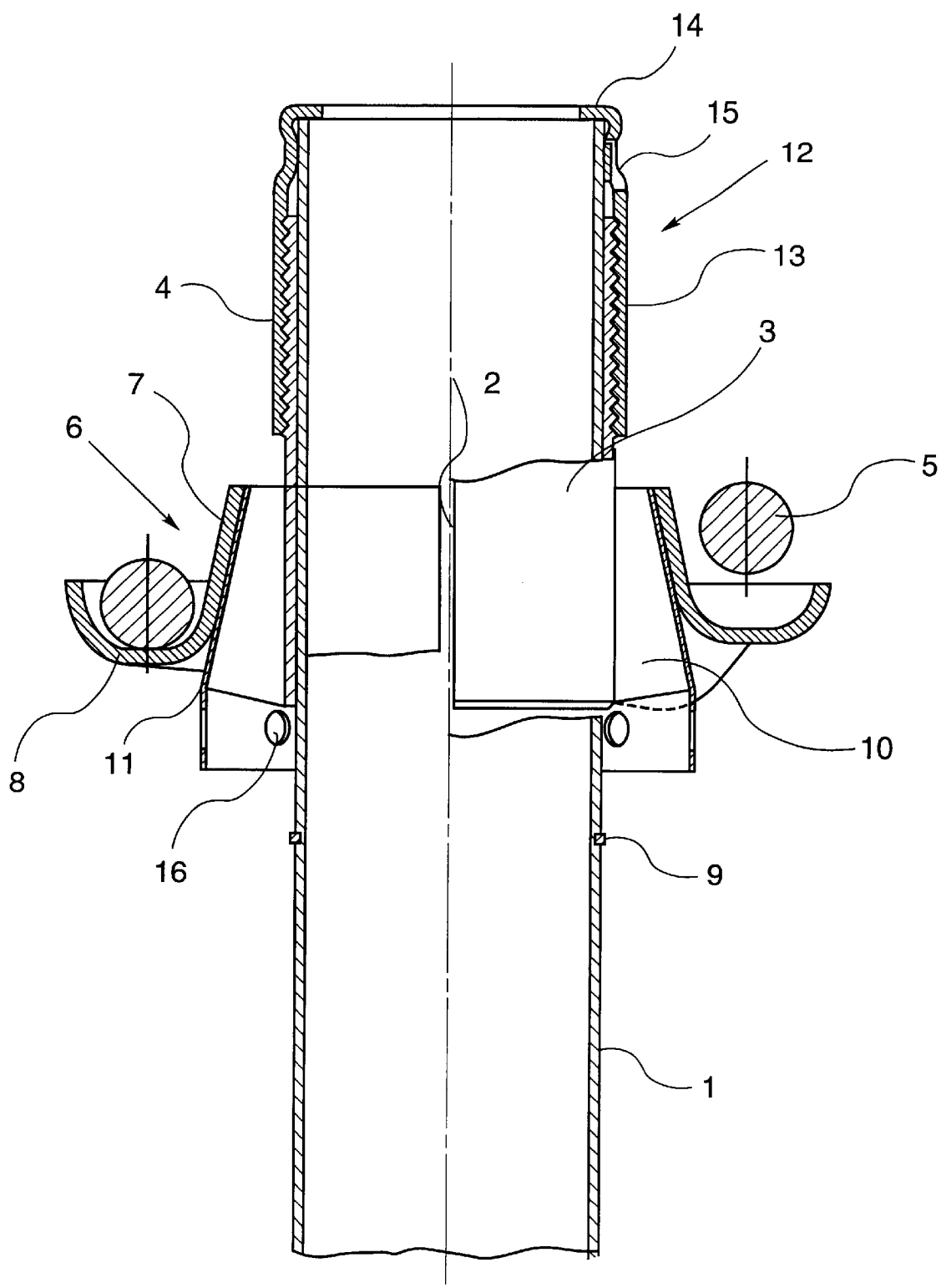
FIG. 2 is a sectional view of a second embodiment of the shock absorber of FIG. 1.

The cylindrical housing 3 in the embodiment illustrated in FIG. 2 is provided with a threaded section 4 along only part of its length. Lower down, housing 3 is enclosed in a sleeve 10, preferably rubber. Sleeve 10 is conical and supports the also conical neck 7 of spring cup 6. Between neck 7 and sleeve 10 is a protective jacket 11. When subject to load, spring cup 6 can potentially compress housing 3 by way of conical neck 7, leading to a corresponding adhesion of the housing to shock-absorber accommodating tube 1 and hence to additional inhibition of rotation. The essential function of sleeve 10, however, is to attenuate any vibration and body noise transmitted by spring 5 and prevent it from reaching the body of the vehicle by way of the shock absorber. Housing 3 and hence spring cup 6 can be raised and lowered by way of a height-adjustment ring 12. Ring 12 is provided with a cylindrical section 13 threaded inside to match the threaded section 4 of housing 3. Above, height-adjustment ring 12 has an inward-facing collar 14 that extends over tube 1. A rotation-inhibiting collar 15 that inhibits rotation between height-adjustment ring 12 and tube 1. Protective jacket 11 is provided with bores 16 that allow it to be rotated while spring cup 6 is not subject to load. Spring cup 6 can accordingly be raised and lowered to any desired level. With housing 3 and hence spring cup 6 at the lowest possible level, securing ring 9 will impede the assumption of any lower level, ensuring a constant connection between the threaded section 4 of housing 3 and the inner threaded section of height-adjustment ring 12. The necessary tightness will be transmitted from the cylindrical section 13 to tube 1 by way of housing 3.

Figure 3:
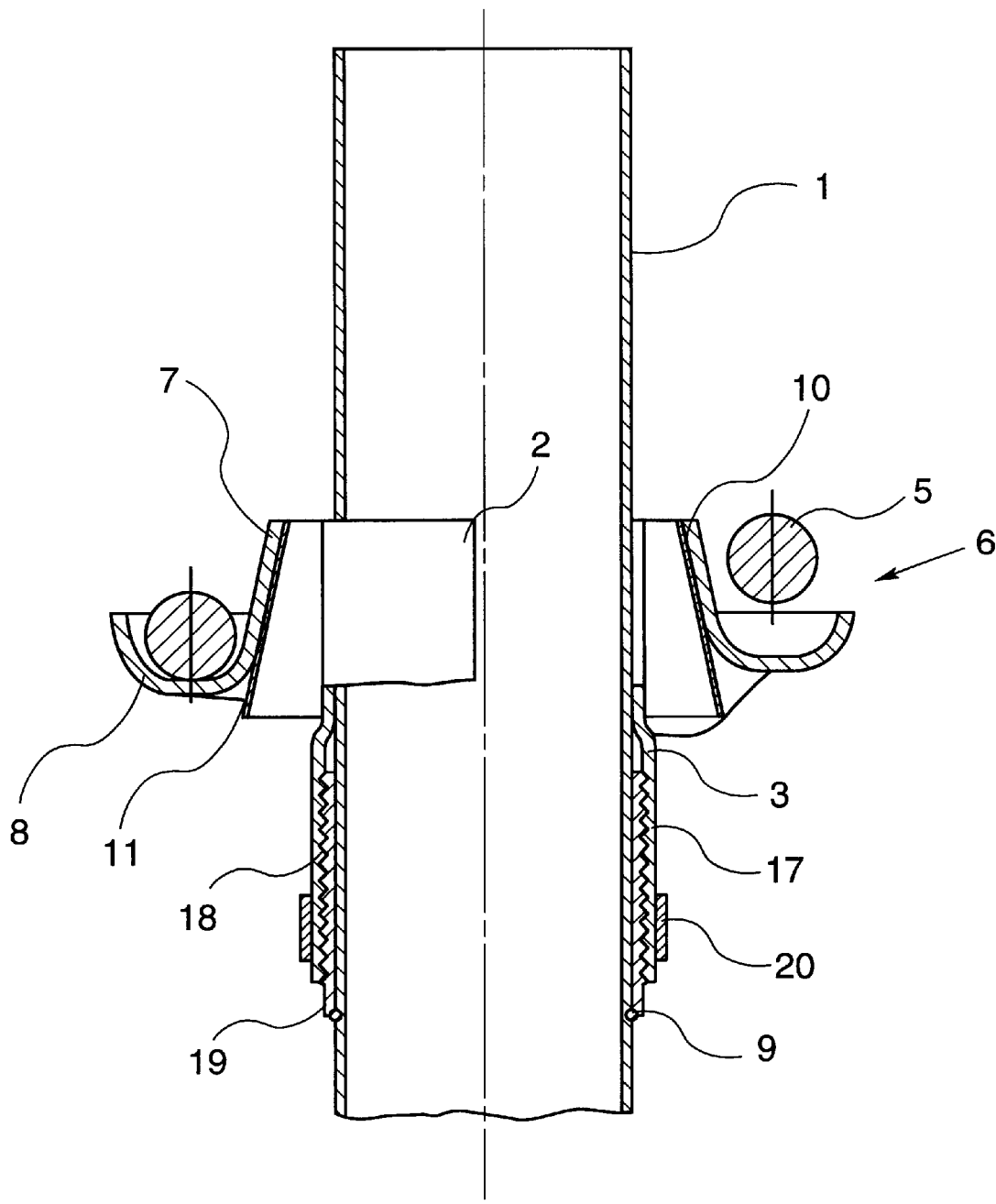
FIG. 3 is a sectional view of a further embodiment of the shock absorber of FIG. 1.

The spring cup 6 in the embodiment illustrated in FIG. 3 is in principle attached to shock-absorber accommodating tube 1 like the cup illustrated in FIG. 2. Spring cup 6 rests here as well with its conical neck 7 against the outer surface of a cylindrical housing 3, provided with a longitudinal slot 2, by way of a protective jacket 11, ensuring a reliable fit between housing 3 and tube 1, along with decreased noise. In contrast to the embodiment illustrated in FIG. 2, however, housing 3 is provided with a longer-diameter cylindrical section 17 below rubber sleeve 10. Cylindrical section 17 is provided with interior threading that matches an outer threaded section 18 on a slotted retaining ring 19. Retaining ring 19 rests against tube 1 by way of a securing ring 9. A rotation of housing 3 in relation to retaining ring 19 will raise and lower spring cup 6. The requisite tightness will be transmitted from retaining ring 19 to tube 1 by way of housing 3.

Cylindrical housing 3 is provided over its total length with a longitudinal slot 2, and inner-threaded and longer-diameter cylindrical section 17 will also accordingly be slotted. To prevent cylindrical section 17 from expanding and the threads on retaining ring 19 and housing 3 from separating, a shallow bushing 20 has been mounted around cylindrical section 17.

What is claimed is:

1. A dashpot for wheel suspensions, comprising: a sheet-metal spring cup attached by an attachment to shock absorber means; an accommodating tube of said shock absorber means; a helical spring supported by said spring cup and surrounding said shock absorber means or said tube and being advancable along said shock absorber means or said tube on threads; a cylindrical housing having a slot extending over a total length of said housing and having outside threads; said housing having an inner surface resting directly against said shock absorber means or said tube, said housing maintaining tight said attachment; a height-adjustment ring or neck with matching inside threads on the spring cup, and operating in conjunction with said housing, said threads having a slope for ensuring that a force exerted by said spring on said spring cup will squeeze the slotted housing together radially.

2. A dashpot as defined in claim 1, wherein said slope or rise of said threads is sufficiently low to ensure that said spring cup will inhibit rotation when subjected to load.

3. A dashpot as defined in claim 1, including a resilient component between a collar of said spring cup and the slotted cylindrical housing.

4. A dashpot as defined in claim 1, including a collar on said spring cup and having a conical neck resting on said cylindrical housing through a conical sleeve of resilient material.

5. A dashpot as defined in claim 4, wherein said sleeve is of rubber or plastic.

6. A dashpot as defined in claim 1, wherein said inside threads extend over a collar on the shock absorber or said tube.

7. A dashpot as defined in claim 1, wherein said cylindrical housing has an inside-threaded cylindrical section of longer diameter than that in a shallow bushing squeezing said housing together.

8. A dashpot as defined in claim 6, wherein said housing or a slotted retaining ring with an outside threaded section operating in conjunction with said inside-threaded cylindrical section rests against the shock absorber or said tube through a securing ring.

9. A dashpot as defined in claim 8, wherein said securing ring is connected to the shock absorber or said tube and is mounted below the lowest level attained by the lower edge of said housing or by a component of said attachment.

* * * * *